July 17, 1956

P. M. HANKISON 2,755,245

MEASURED FLOW CONTROL OF LIQUID

Filed March 3, 1954

INVENTOR.
PAUL M. HANKISON
BY
Christy, Parmelee and Strickland
HIS ATTORNEYS

United States Patent Office 2,755,245
Patented July 17, 1956

2,755,245
MEASURED FLOW CONTROL OF LIQUID

Paul M. Hankison, Pittsburgh, Pa., assignor to Hankison Corporation, Pittsburgh, Pa., a corporation of Pennsylvania Application March 3, 1954, Serial No. 413,921

8 Claims. (Cl. 210—17)

This invention relates to a measured flow control of liquid. More particularly the invention relates to an apparatus for the control of the flow of liquid which indicates measured rates of flow of liquid that may be varied over a wide range of rates of flow from minute drops to large stream flow. The apparatus is adapted for handling liquids that may have solid suspended material therein and the flow control parts may be arranged to provide for the physical and chemical properties of different liquids, such as density, specific gravity, viscosity, temperature, acidity and the like.

The present invention is an improvement of the liquid feed control device illustrated and described in the patent of Moore 2,131,329 granted September 27, 1938. The Moore apparatus was designed particularly for obtaining a full control of a wide range of flow rates and to maintain the rate of flow constant while a tank or reservoir containing the liquid was being emptied. This device made no measurement of flow and is not capable of proportioning its rate or volume of flow to the rate or volume of flow of another liquid passing through a separate line. Further the device is not capable of modifying the composition of a flowing stream of a separate liquid having a variable composition to have a uniform composition. Also the Moore apparatus is not adapted for handling corrosive liquids or liquids containing suspended solids.

For the measuring of liquids and proportioning two or more liquids, it is very desirable to have an apparatus that may accurately handle different types of liquids and liquids that contain impurities and also suspended solids. It is also important that the measurement and/or proportionment of two or more streams of liquid shall be accurate when handling very small volumes or large volumes.

The primary object of the present invention is to provide an apparatus for obtaining a measured flow control of fluid and at the same time indicating the rate of flow of the fluid.

Another object of the invention is to provide an apparatus for indicating the rate of a measured flow of liquid in which the indicated rate is not affected by impurities or solids suspended in the liquid.

A further object of the invention is to provide an apparatus for adding a liquid to another controlled and moving body of liquid in a proportion based on the volume or a specific property of the moving body.

A still further object of the invention is to provide an apparatus for adjusting the property of a continuously flowing body of liquid having a variable physical or chemical property to obtain a moving body having a uniform physical or chemical property.

With these and other objects in view the invention consists in the measured liquid flow control herein illustrated and described and particularly defined in the appended claims.

The various features of the invention are illustrated in the accompanying drawings in which.

Figure 1:
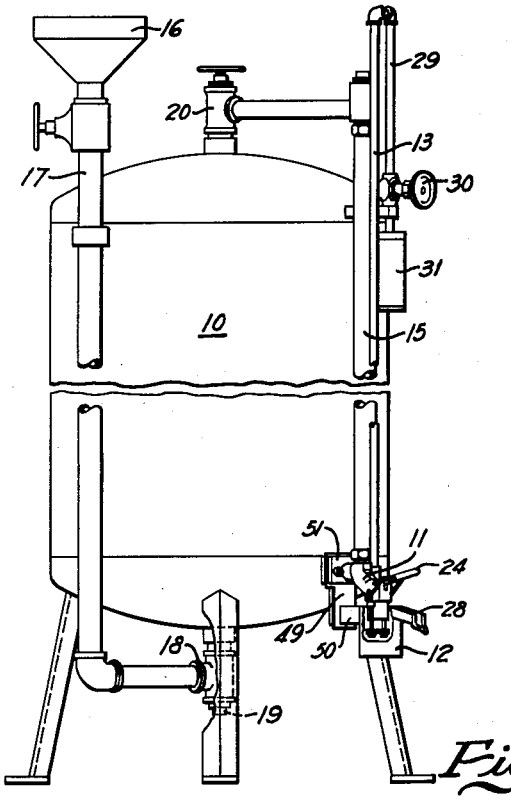
Fig. 1 is a view in front elevation of a flow controlling apparatus embodying the preferred form of the invention.
Figure 2:
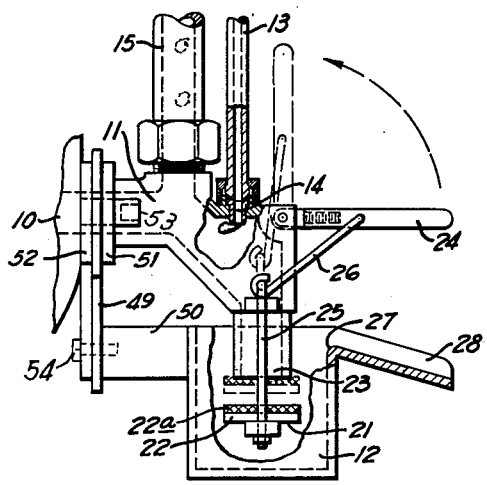
Fig. 2 is a view in side elevation with parts shown in section of the valve controlled nozzle for drawing liquid from the storage reservoir.

The flow controlling apparatus of the present invention is shown more particularly in Figs. 1 and 2 of the drawing. This apparatus comprises a tank 10 which acts as a reservoir for holding the liquid to be dispensed, a flow control nozzle 11 dipping into a weir cup 12 and flow controlling pipe 13 having a calibrated orifice 14 which discharges predetermined volumes of air into a volume indicating tube 15.

The tank or reservoir 10 may be any desired size to have a capacity from one pint to thousands of gallons. The tank is closed and depends upon a partial vacuum within the tank to secure the desired flow control. The liquid to be dispensed from the tank is introduced into the tank through a funnel 16 and valve controlled line 17 which enters the bottom of the tank 10. A T 18 and plug 19 are mounted in the filling line 17 whereby liquid may be drawn off from the bottom of the tank for cleaning or other purposes. When liquid is introduced into the reservoir through the line 17, an air release valve 20 mounted in the top of the tank is open to allow the air to escape through a hollow stem from the reservoir to facilitate flow of the fluid into the reservoir and for maintaining atmospheric pressure above the liquid in the reservoir. As soon as the tank is filled, the valve 20 is closed in order to obtain the desired feed pressure in the reservoir as hereinafter described.

The liquid to be dispensed is drawn off from the bottom of the reservoir through the nozzle 11 which has a comparatively large flow capacity bore so that liquids which contain suspended material will readily flow through the nozzle and not act to clog or restrict the flow through the nozzle nor have appreciable velocity drop at large volume flows. A valve 21 is mounted on the nozzle for the purpose of closing the outlet 23 from the nozzle at the time that the reservoir is being filled with liquid. As shown particularly in Fig. 2 the valve is a plate 22 having a plastic gasket 22a on its upper surface which is drawn into engagement with the bottom 23 of the nozzle when a handle 24 is moved from the horizontal position to the dotted line position as shown in Fig. 2. The handle 24 is connected by means of rods 25 and toggle lines 26 to the valve plate 22 by which the valve may be drawn against the bottom of the nozzle with sufficient pressure to tightly close the nozzle.

The inlet of the nozzle 11 is located above the bottom of the tank or reservoir 10 in a position to allow a full stream of liquid to flow through the nozzle. The bottom of the outlet 23 of the nozzle is positioned within the weir cup 12 so that the outlet of the nozzle will always be located below an overflow weir 27 of the cup 12. The liquid being dispensed overflows from the cup weir and passes through a spout 28. This liquid is measured in volume and has its flow rate controlled by the apparatus.

In order to measure the volume of liquid passing over the weir 27 the orifice 14 is mounted in the nozzle and arranged to discharge a stream of flow controlling air or other gaseous fluid into the nozzle. Different sizes of orifices 14 may be used which are calibrated to give definite volumes of air at different flow rates. The size of the orifice must be calibrated in accordance with the density, viscosity and temperature of the liquid to be measured. The outlet of the orifice 14 is preferably below the fluid inlet of the nozzle so that the flow controlling air entering through the orifice will come directly into contact with fluid in the nozzle. The orifice 14 constitutes an outlet from the flow controlling pipe 13 which extends upwardly to an elevation considerably above the upper level of any fluid that may be introduced into the reservoir 10. As shown in the drawing, the flow controlling pipe makes a return bend 29 and has a control valve 30 mounted at its lower end immediately above an air filter 31. With this arrangement air at atmospheric pressure is drawn in through the filter 31 and pipes 29 and 13 into the liquid passing through the nozzle. With atmospheric pressure in the reservoir and the valve 20 closed, liquid will flow over the weir to create a vacuum condition in the reservoir above the liquid which will become balanced when the vacuum or partial pressure in the reservoir equals atmospheric pressure, which bears on the liquid in the weir, less the weight of a column of liquid between the liquid level of the weir and the liquid level in the reservoir. At this balanced pressure, liquid will stop flowing over the weir. To create a flow over the weir 27, air is introduced into the reservoir from tube 15 above the liquid, and liquid, in a volume equal to the volume of air introduced, flows from the cup over the weir. A valve 30 in the flow controlling pipe 13 may be adjusted for controlling the volume of air for introducing air into the reservoir. As the air is introduced, liquid will flow out of the reservoir into the cup 12 and over the weir 27. The head of the liquid between the orifice 14 and weir 27 remains constant with a constant rate of flow while the head of liquid in the reservoir 10 falls. The head of liquid between the weir level and the level of the bottom of orifice 14 for most liquids is about 1½ inches. By adjusting the cup 12 vertically the weir level may be changed to vary the balanced pressure and the flow.

The air introduced through the orifice 14 passes into the nozzle 11 and then passes upwardly through the sight glass tube 15. By knowing the size of the orifice 14 and the number of bubbles per unit of time passing upwardly through the sight glass, an accurate measurement of the volume of air introduced is provided. As the valve 30 is adjusted, the number of bubbles of air passing up through the sight glass increases or decreases, and likewise the volume of liquid flowing over the weir increases and decreases. The passage of air as bubbles up through the sight glass therefore is an indication of the volume of liquid overflowing the weir 27. It will be seen that by providing different sizes of orifices 14, bubbles of different volumes may be passed through the sight glass and a flow from less than a pint to many hundreds of gallons of liquid per day may be obtained with a comparatively large nozzle that will not be clogged by contaminants in the liquid being measured.

Figure 3:
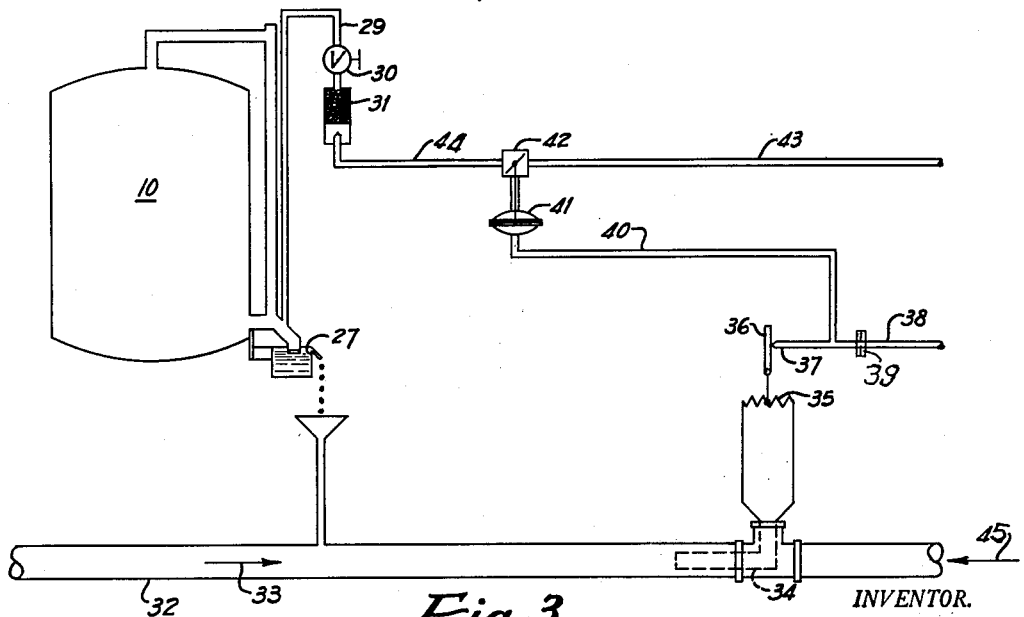
Fig. 3 is a diagrammatic view in elevation showing the flow controlling apparatus as used with a fluid flow line for adding measured volumes of liquid to the liquid passing through the flow line.

The apparatus shown in Fig. 3 is particularly adapted for proportioning one liquid to be added to another flowing stream of liquid. For example, a stream of water may pass through a flow pipe 32 in the direction of the arrow 33 and sulfuric acid from the reservoir 10 may be introduced in a measured quantity into the water for the purpose of developing a desired or neutral pH in the water. Such an acid condition is very desirable in the water of cooling towers, because the natural result of the evaporation of alkaline water in cooling towers is to generate an excessive alkaline condition on the wooden cooling slats. This alkaline condition acts to destroy the cooling slats. By maintaining a desired acid or neutral condition in the water the cooling slats are protected and preserved.

The amount of acid which is introduced into the flow line 32 is measured and dispensed by means of the flow control apparatus of the present invention. To automatically control the amount of acid being added to the water, a pH conductivity unit 34 is mounted in the flow line and the pH conductivity measurement is used to control the volume of air introduced into the reservoir to proportion the volume of acid to be added to the line 32. To secure this measured proportioning, air at a constant pressure of about 15 pounds per square inch is passed through a line 38 to a measuring orifice 39 and then flows to a nozzle 37. The pH conductivity measurement is conveyed to a pH amplifier 35 which operates a flapper valve 36 mounted in front of the nozzle 37. The changes in the area of the opening in the nozzle 37 by the flapper valve 36 creates a differential pressure across the orifice 39 to make changes in the pressure of air in a line 40 leading to a diaphragm motor 41. The diaphragm in the motor is connected to a throttle valve 42. The inlet of valve 42 is connected with a line 43 that is open to the atmosphere and the adjustment of the valve 42 in accordance with the pH conductivity measurement controls the volume of air, at sub-atmospheric pressure that flows through a line 44 to the filter 31 and then through the lines 29 and 13 and the orifice 14 into the reservoir 10. When the valve 42 is used for automatically controlling the volume of air introduced to the reservoir, the valve 30 is fully opened and is not used for controlling the air flow.

In some types of operations it will be desirable to maintain a physical or chemical property of a liquid uniform. If this is the case the liquid would be passed through the line 32 in the direction of the arrow 45 to have its physical or chemical character measured for pH conductivity or electrical conductivity, and thereafter the amount of modifying liquid required to bring its physical or chemical property into a uniform desired condition will be added to the flowing liquid from the reservoir 10 over the weir 27.

The apparatus may also be used for proportioning the volume of two streams of liquid. In this case the large volume flow of liquid would pass through a flow line such as 32 after passing through a meter. As the volume of the liquid varies as indicated by the meter, the valve 42 will be operated proportionately to control the flow of air passing through the line 43 into the flow control line 13, and thus introduce into a line such as 32 a volume of liquid passing over the weir 27 which is proportionate to the volume of liquid passing through the line 32.

In using the flow control of the present invention, the pH indication of a flowing liquid may be used, for example, in plating of metals, the scouring, bleaching, dyeing, and dye fixing of textiles, the character of solutions used in laundry, a sizing and control of solutions used in paper making, leather refining, and in the purification of water and disposal of sewage. There are many other industries which may use the pH measurement for controlling the proportioning of modifications of the character of the liquid being used in the industry.

The electrical conductivity of a liquid may also be used as a means of measuring the nature of solutions used in power plants, chemical industry, water treatment, and textile industries.

The flow measuring and controlling apparatus of the present invention is preferably made of corrosion-resistant stainless steel in order that various corrosive chemicals may be measured and dispensed with the apparatus.

Many acids tend to creep over apparatus in which they are held. This is particularly true of concentrated sulfuric acid. The thin film of creeping acid absorbs moisture from the air and the diluted acid is quite corrosive. To prevent creep of solutions to the tank 10 and valve handle 24, these parts are insulated by corrosion-resistant resins which are not wetted by most corrosive liquids. The handle 24 is made of non-wetting resin, and a plastic resin strip 49 is mounted around the nozzle 11 between a washer 51 and supporting plate 52 by means of cap screws 53 which are secured in the tank. A supporting arm 50 integral with the weir cup 12 extending to the rear thereof, engages the resin strip 49 and is attached to the plate 52 by screw 54.

The preferred non-wetting resins which may be used for insulating against corrosion are sold under the trade names "Teflon" and "Kel-F." Teflon is a polytetrafluoroethylene and Kel-F is a polytrifluorochlorethylene.

The preferred form if the invention having been thus described, what is claimed as new is:

1. A liquid flow control apparatus comprising, a closed liquid reservoir, a valved liquid inlet pipe connected with the bottom of the reservoir, a valved air outlet pipe connected with the top of the reservoir providing atmospheric pressure within the reservoir during filling, a large flow capacity outlet nozzle adjacent the bottom of the reservoir dipping into a sealing cup, a weir over-flow liquid outlet at the top of the cup and positioned above the liquid outlet level of the nozzle dipping into the cup for normally maintaining a seal for liquid flowing through the nozzle, a transparent flow measuring tube having one end opening into the liquid in the nozzle and the other end connected with the top of the reservoir, a flow control tube having one end opening into the liquid within the outlet nozzle adjacent the opening in the flow measuring tube and its opposite end connected with the atmosphere, and a valve in said control tube adjacent the end thereof connected with the atmosphere providing accurate control of admission of air to the reservoir through the flow control and measuring tubes.

2. The flow control apparatus as defined in claim 1 in which a calibrated flow orifice of different flow capacities is mounted in the bottom of a flow control tube to indicate the air intake volume and the volume of liquid passing over the outlet weir.

3. The flow control apparatus as defined in claim 1 in which a valve closure is mounted on the liquid outlet nozzle for closing the nozzle while the reservoir is being filled with liquid.

4. The liquid flow control apparatus as defined in claim 2 in which the calibrated flow orifice in the bottom of the flow tube is connected into the flow nozzle at a point below the level of the inlet side of the nozzle within the reservoir.

5. The liquid flow controlling apparatus as defined in claim 1 in which the flow nozzle is connected to the reservoir and tank by a non-wetting plastic.

6. A liquid flow measuring and controlling apparatus as defined in claim 2 in which a liquid flow pipe is positioned adjacent to the weir outlet of the cup, a line is connected between the outlet weir and the liquid flow pipe to introduce liquid overflowing the weir into the flow pipe, the flow control tube is extended beyond its valve and the valve is fully opened, a volume control valve is mounted in the extension of the flow control tube and a mechanism for measuring a selected property of the liquid passing through the flow pipe is mounted in the flow pipe in contact with the liquid flowing through the pipe, and operating devices are connected between the measuring mechanism and the volume control valve to automatically control the volume of air entering the flow control tube in accordance with variations of a selected property of the liquid within the liquid flow pipe.

7. A liquid flow measuring and control apparatus as defined in claim 2 in which a liquid flow pipe is positioned adjacent the weir outlet of the cup, a pipe arranged to receive liquid from the weir outlet is connected with the flow pipe, the flow control tube is extended beyond its valve and the valve is fully opened, a volume control valve is mounted in the flow control tube extension, a mechanism for measuring the pH value of liquid flowing through the flow pipe is mounted in the flow pipe and connected with the volume control valve to control the volume of air entering the flow control tube in accordance with the pH value of liquid within the flow pipe.

8. A liquid flow measuring and control apparatus as defined in claim 6 in which the mechanism for measuring the volume of air entering the flow control tube is a valve for measuring the air volume at subatmospheric pressure.

References Cited in the file of this patent

UNITED STATES PATENTS

| | | |
|---|---|---|
| 678,462 | Etheridge | July 16, 1901 |
| 2,131,329 | Moore | Sept. 27, 1938 |
| 2,234,561 | Kittredge | Mar. 11, 1941 |
| 2,287,284 | Behrman | June 23, 1942 |

FOREIGN PATENTS

| | | |
|---|---|---|
| 3,674 | Great Britain | of 1912 |